United States Patent
Ohsumi (10) Patent No.: US 10,268,972 B2
(45) Date of Patent: *Apr. 23, 2019

(54) WORK SUPPORT SYSTEM, WORK SUPPORT METHOD AND COMPUTER-READABLE RECORDING MEDIUM

(71) Applicant: CASIO COMPUTER CO., LTD., Shibuya-ku, Tokyo (JP)

(72) Inventor: Tsuyoshi Ohsumi, Akiruno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 273 days.

This patent is subject to a terminal disclaimer.

(21) Appl. No.: 15/176,031

(22) Filed: Jun. 7, 2016

(65) Prior Publication Data

US 2017/0052656 A1 Feb. 23, 2017

(30) Foreign Application Priority Data

Aug. 21, 2015 (JP) ................................. 2015-163922

(51) Int. Cl.
*G06Q 10/06* (2012.01)

(52) U.S. Cl.
CPC .......... *G06Q 10/0631* (2013.01); *Y04S 10/54* (2013.01)

(58) Field of Classification Search
CPC ... G06F 3/048; G06F 3/0488–3/04886; G06Q 10/109; G06Q 10/0631
See application file for complete search history.

(56) References Cited

U.S. PATENT DOCUMENTS

| 7,107,268 B1 * | 9/2006 | Zawadzki | G06Q 10/06 |
| 2001/0042032 A1 * | 11/2001 | Crawshaw | G06Q 10/06 705/32 |

(Continued)

FOREIGN PATENT DOCUMENTS

| JP | 06301502 A | 10/1994 |
| JP | 10069578 A | 3/1998 |
| JP | 2014518409 A | 7/2014 |
| JP | 2014519632 A | 8/2014 |

OTHER PUBLICATIONS

Harkins, Susan. "10 Cool New Charting Features in Excel 2013." TechRepublic, Aug. 2, 2013, www.techrepublic.com/blog/10-things/10-cool-new-charting-features-in-excel-2013/.*

(Continued)

*Primary Examiner* — Jennifer N To
*Assistant Examiner* — Liang Y Li
(74) *Attorney, Agent, or Firm* — Holtz, Holtz & Volek PC (57) ABSTRACT

A work support system of an embodiment of the present invention includes a task information display control unit to display a list display screen to display a list of a plurality of task indices including contents of a task to be processed using an application, a first icon for causing transition to a head screen or initial screen of the application, and a second icon for causing transition to an operation screen of the application corresponding to the contents of the task and a screen control unit to cause transition from the list display screen of the task indices to the head screen or initial screen of the application upon selection of the first icon and to cause transition from the list display screen of the task indices to the operation screen of the application corresponding to the contents of the task upon selection of the second icon.

20 Claims, 8 Drawing Sheets

(56) References Cited

U.S. PATENT DOCUMENTS

| | | |
|---|---|---|
| 2005/0033626 A1 | 2/2005 | Kruse et al. |
| 2008/0005168 A1* | 1/2008 | Huff .................. G06F 17/30 |
| 2008/0154690 A1 | 6/2008 | Mommeja |
| 2008/0235066 A1 | 9/2008 | Mano |
| 2010/0333014 A1 | 12/2010 | Fritzley et al. |
| 2012/0260202 A1 | 10/2012 | Jiang et al. |
| 2012/0309363 A1 | 12/2012 | Gruber et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2015/0286383 A1 | 10/2015 | D'Aloisio et al. |
| 2016/0086116 A1* | 3/2016 | Rao ................ G06Q 10/06311 |
| | | 705/7.21 |

OTHER PUBLICATIONS

Japanese Office Action (and English translation thereof) dated Aug. 29, 2017, issued in counterpart Japanese Application No. 2015-163922.

U.S. Appl. No. 15/176,056; First Named Inventor: Tsuyoshi Ohsumi; Title: "Work Support System, Work Support Method and Computer-Readable Recording Medium"; filed Jun. 7, 2016.

Office Action (Non-Final Rejection) dated Jan. 25, 2019 issued in related U.S. Appl. No. 15/176,059.

\* cited by examiner

| | Task0001 | Task0002 | Task0003 |
|---|---|---|---|
| TASK ID | | | |
| WHETHER APPLICATION PROCESSING IS REQUIRED | REQUIRED | REQUIRED | NOT REQUIRED |
| PROCESSED FLAG | UNPROCESSED | UNPROCESSED | UNPROCESSED |
| REGISTERED DATE | 7/25/2015 | 7/2/2015 | 7/29/2015 |
| DEADLINE OF PROCESSING | 8/1/2015 | 7/31/2015 | 7/29/2015 |
| PROCESSED DATE | — | — | — |
| NAME OF PROCESSING APPLICATION | EMPLOYMENT MANAGEMENT | ACCOUNTING MANAGEMENT | SALES MANAGEMENT |
| PROGRAM ID OF CORRESPONDING PROCESSING | AP001_01 | AP002_00 | AP003_00 |
| COMMENT | Mr./Ms. Y WANTS TO CHANGE SHIFT. | CONFIRM LAST MONTH'S LEDGER. | ACHIEVED TODAY'S SALES TARGET. |
| THUMBNAIL ID | 0000 | — | 0001 |
| THUMBNAIL DATA | (TABLE DATA) | — | (GRAPH DATA) |

WORK SUPPORT SYSTEM, WORK SUPPORT METHOD AND COMPUTER-READABLE RECORDING MEDIUM

BACKGROUND OF THE INVENTION

1. Field of the Invention

The present invention relates to a work support system, work support method and computer-readable recording medium.

2. Background Art

Sole proprietors or corporate owners in the restaurant business or retail business often perform business management using business oriented application programs such as accounting applications to perform tax payment processing of fixed property tax, sole proprietorship tax, or the like, salary applications to perform salary calculation processing of workers, employment management applications to perform management of workers shift in a store and attendance management processing of workers, sales management programs to perform sales totaling or analysis by days or months of a store, notification document management programs to produce/manage notification documents for related business operators or workers, and point of purchase advertising (POP) production applications to produce POP that is an advertising medium for sales promotion used in stores.

A large part of operations processed using these business oriented application programs includes "to dos" or "things that has to be done" (hereinafter referred to as a "ToDo task") at a predetermined time such as business report, declaration, or salary payment processing.

Meanwhile, there is a technique to generate a ToDo list and perform execution management by varying display of ToDo tasks based on attribution thereof in order to manage a plurality of ToDo tasks (e.g. refer to Japanese Translation of PCT International Application Publication No. 2014-518409).

For details, Japanese Translation of PCT International Application Publication No. 2014-518409 discloses a device to be connected to a natural language processing (NLP) service in a cloud via a network and describes about generating a task (reminder) through NLP processing of mails or conversations and displaying the task based on attribution thereof.

According to the above related technique, generation of a ToDo list becomes easier while the contents of the ToDo task can be easily grasped. However, there is an issue that, when the technique is applied to the restaurant business or retail business where operation is carried out by a plurality of business oriented application programs as described above, cooperation with the business oriented application programs used for processing of the ToDo tasks is not considered.

SUMMARY OF THE INVENTION

An object of the present invention is to enable easily grasping the contents of a task to be processed with an application.

A work support system of an embodiment of the present invention includes a task information display control unit to display a list display screen where a list of a plurality of task indices is displayed, the task index including contents of a task to be processed using an application, a first icon for causing transition to a head screen or initial screen of the application, and a second icon for causing transition to an operation screen of the application corresponding to the contents of the task to be processed and a screen control unit to cause transition from the list display screen of the task indices to the head screen or initial screen of the application upon selection of the first icon and to cause transition from the list display screen of the task indices to the operation screen of the application corresponding to the contents of the task to be processed upon selection of the second icon.

A work support method of an embodiment of the present invention includes a display step of displaying a list display screen where a list of a plurality of task indices is displayed, the task index including contents of a task to be processed using an application, a first icon for causing transition to a head screen or initial screen of the application, and a second icon for causing transition to an operation screen of the application corresponding to the contents of the task to be processed and a transition step of causing transition from the list display screen of the task indices to the head screen or initial screen of the application upon selection of the first icon and causing transition from the list display screen of the task indices to the operation screen of the application corresponding to the contents of the task to be processed upon selection of the second icon.

A non-transitory computer-readable recording medium of an embodiment of the present invention storing a program for causing a computer to execute procedures of displaying a list display screen where a list of a plurality of task indices is displayed, the task index including contents of a task to be processed using an application, a first icon for causing transition to a head screen or initial screen of the application, and a second icon for causing transition to an operation screen of the application corresponding to the contents of the task to be processed and causing transition from the list display screen of the task indices to the head screen or initial screen of the application upon selection of the first icon and causing transition from the list display screen of the task indices to the operation screen of the application corresponding to the contents of the task to be processed upon selection of the second icon.

The present invention allows for easily grasping the contents of the task to be processed with the application.

DETAILED DESCRIPTION OF THE PREFERRED EMBODIMENT

Hereinafter, an embodiment of the present invention will be described in detail with reference to the drawings.

«System Configuration»

Figure 1:
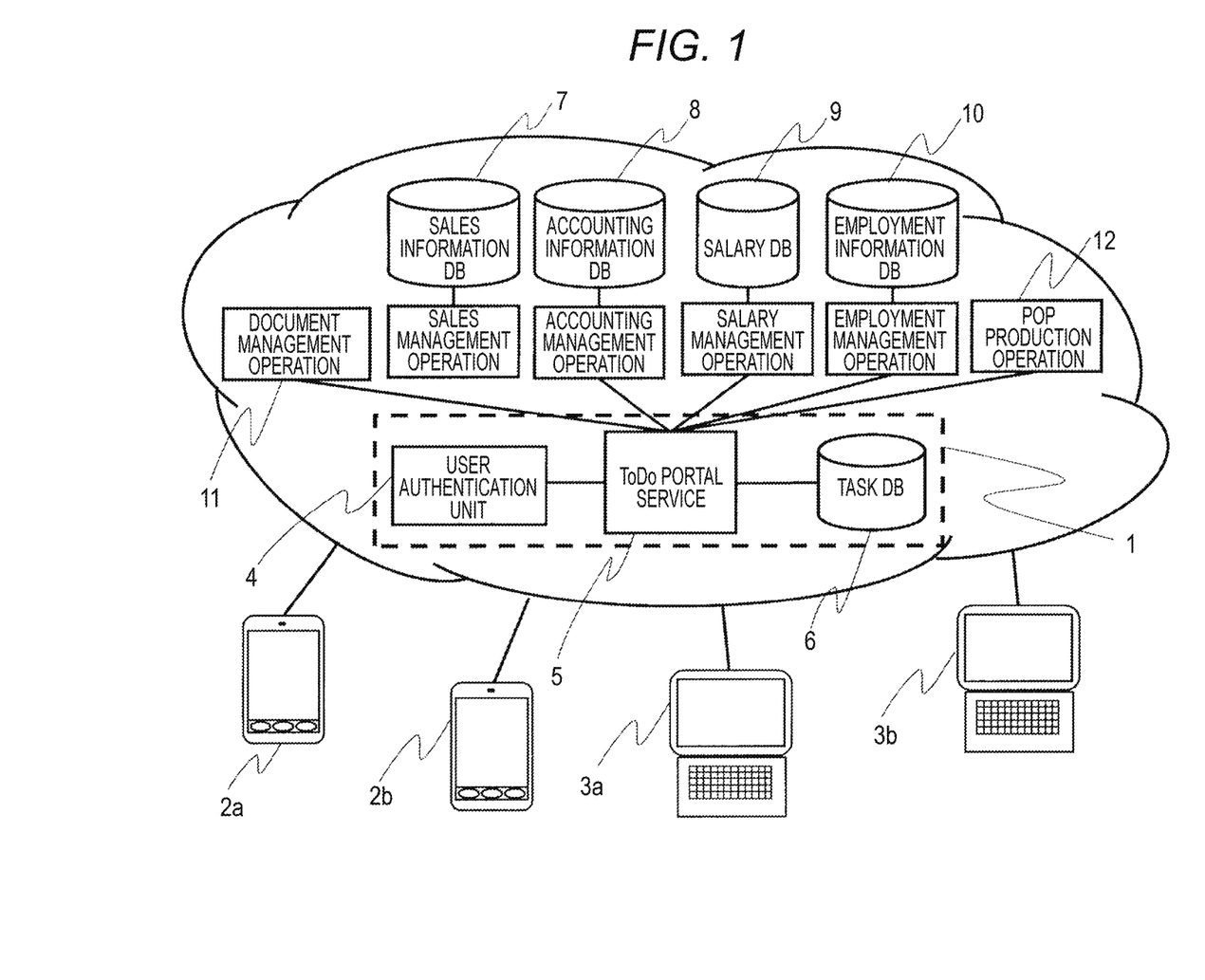
FIG. 1 is a diagram illustrating a configuration of a work support system.

FIG. 1 is a diagram illustrating a configuration of a work support system 1 of the embodiment.

The work support system 1 performs work support of portable terminals 2a and 2b or personal computers (PCs) 3a and 3b that are user terminals, connected thereto in the form of cloud computing, such as smartphones or tablet terminals. Hereinafter, the portable terminals 2a and 2b and PCs 3a and 3b are collectively referred to as user terminals. Incidentally, the PCs 3a and 3b may be dedicated terminals such as electronic registers or POS terminals.

Specifically, the work support system 1 of the embodiment performs work support of sales management operation 7 to perform sales totaling or analysis by days or months of a store with a sales information DB, accounting management operation 8 to perform tax payment processing of fixed property tax, sole proprietorship tax, or the like with an accounting information DB, salary management operation 9 to perform salary calculation processing of workers with a salary DB, employment management operation 10 to perform management of workers shift in a store and attendance management processing of workers with an employment information DB, document management operation 11 to produce/manage notification documents for related business operators or workers, or point of purchase advertising (POP) production operation 12 to produce POP that is an advertising medium for sales promotion used in stores.

Each of the above operations is provided as an application program (hereinafter simply referred to as an "application") executed by a server device and is used from the user terminal. The server device includes a storage unit formed by a nonvolatile storage device such as a hard disc drive, a memory formed by a volatile storage device such as a RAM, an arithmetic unit, such as a CPU, to execute a program retained in the storage unit by reading the program in the memory and to perform determination, arithmetic operation, and control processing, and a communication unit, connected to a network, to perform communication processing with another device.

«Outline of ToDo Portal Service»

The user terminal can directly and individually execute an application of the aforementioned individual operation; however, there is an issue of complicated processing such that it is desired to perform management of execution locations or login processing of the individual operation application for each individual application. Also, there is another issue that it is not easy to integrally manage and execute ToDo tasks of the respective operations.

Therefore, the work support system 1 of the embodiment provides, to the user terminal, ToDo portal service 5 to perform integrated management of ToDo tasks of the aforementioned respective operations and activation of an application related to the ToDo task. This enables one stop service of the operations.

This ToDo portal service 5 is a web application in cooperation with the aforementioned respective operation applications described in a markup language such as HTML5 and is provided as an application in a server device. The user terminal accesses this application by a web browser or the like and executes the ToDo portal service 5.

Moreover, the work support system 1 of the embodiment is configured as a server device including a storage unit formed by a nonvolatile storage device such as a hard disc drive, a memory formed by a volatile storage device such as a RAM, an arithmetic unit, such as a CPU, to execute a program retained in the storage unit by reading the program in the memory and to perform determination, arithmetic operation, and control processing, and a communication unit, connected to a network, to perform communication processing with another device.

Furthermore, the work support system 1 of the embodiment includes a task DB 6 to store ToDo tasks for each user terminal (user). The ToDo portal service 5 refers to this DB 6 and displays, on the user terminal, a list of task indices 23 which represents an outline of the ToDo tasks and serves as an index for executing the related operation applications. The ToDo portal service 5 further activates an application related to the ToDo task upon operation of the task index 23 by the user.

The work support system 1 further includes a user authentication unit 4. The ToDo portal service 5 performs login authentication of the user terminal (user) in cooperation with the user authentication unit 4. This user authentication collectively performs authentication processing upon activation of applications related to the ToDo tasks. Details thereof will be described later. As a result, activation of applications related to the ToDo tasks becomes easier, thereby enhancing usability.

«Portal Service Screen on PC»

Next, a screen configuration of a portal service screen displayed on the user terminal will be described with FIGS. 2A and 2B.

Figure 2A:
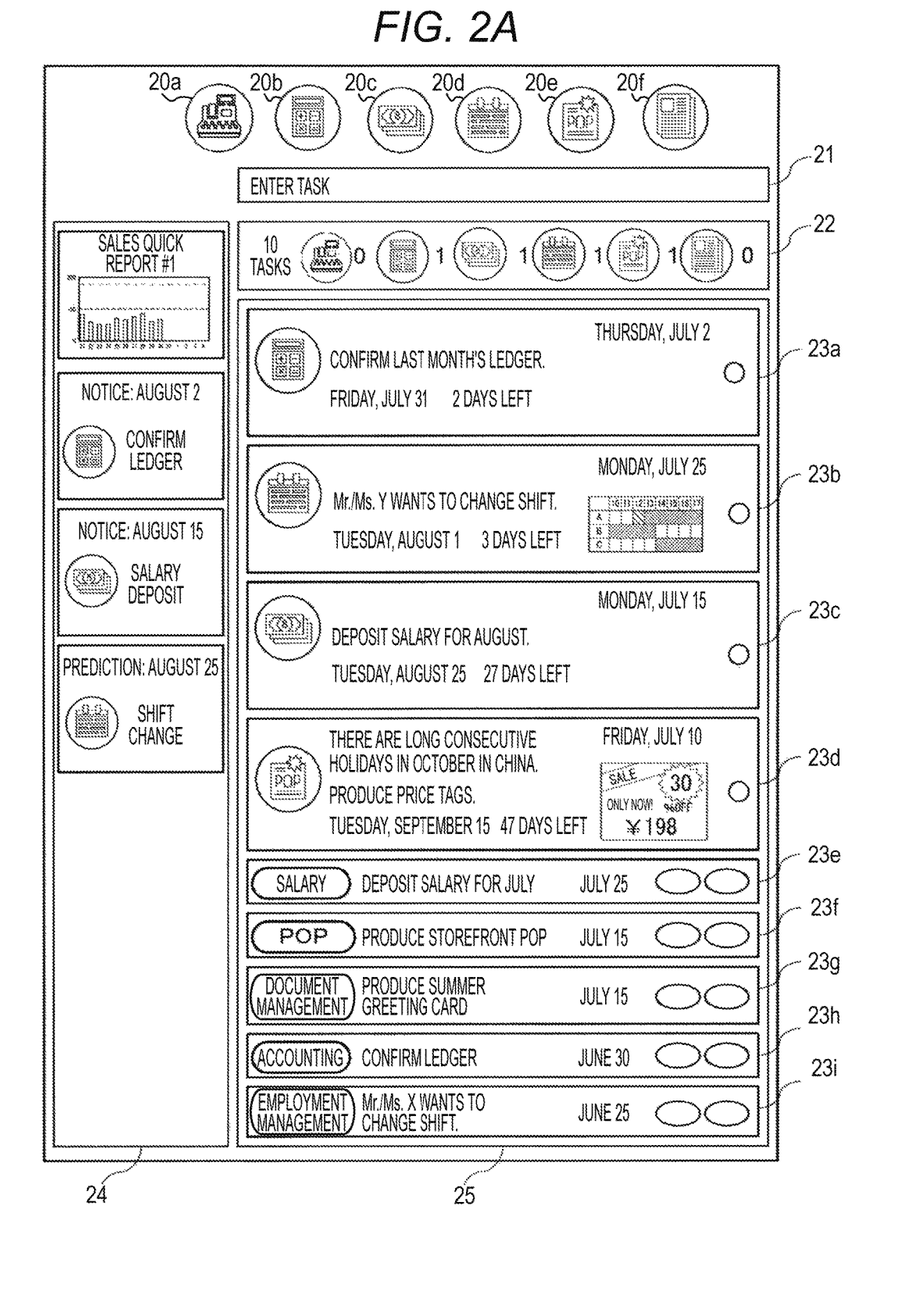
FIG. 2A is a diagram illustrating an exemplary portal service screen on a PC.

FIG. 2A illustrates the portal service screen displayed on a screen by a web browser of the PCs 3a and 3b.

«Menu Bar of Application»

In the upper part of the portal service screen, a menu bar is displayed where icons for activating a plurality of business oriented application programs (hereinafter collectively referred to as "application icons 20") is arranged for each application. Specifically, the menu bar displays an application icon 20a of sales management operation 7, application icon 20b of accounting management operation 8, application icon 20c of salary management operation 9, application icon 20d of employment management operation 10, application icon 20e of POP production operation 12, and application icon 20f of document management operation 11.

When the user clicks or taps on the application icon 20 in the menu bar, screen transition to a predetermined processing screen of the application corresponding to the application icon 20 occurs, thereby allowing for activating the operation application. Here, the predetermined processing screen may be a processing screen of a representative function of a plurality of functions of the application, an initial screen, or a setting screen.

This menu bar is always displayed even after screen transition to the processing screen of the application.

«Task Registration Area»

Below the aforementioned menu bar, a task registration area (text box) 21 denoted as "Enter task." is displayed. Inputting letters in this area allows the user to manually register a ToDo task separately from the ToDo tasks notified by the respective operation applications, details of which will be described later.

«Total Task Number Display Area»

Below the task registration area 21, a total task number display area 22 is displayed. This total task number display area 22 displays a total number of ToDo tasks (ten tasks in FIG. 2A) and the number of ToDo tasks of each application together with the corresponding application icon 20.

The ToDo portal service 5 increases the number of ToDo tasks of the application upon receiving a task notification from the operation application and decreases the number of ToDo tasks when the user executes the application corresponding to the ToDo task. The total number of ToDo tasks increases or decreases in conjunction with an increase or decrease of the number of ToDo tasks. This allows the user to easily grasp an amount of ToDo tasks to be processed.

«Task Index List Display Area»

Below the total task number display area 22, a task index list display area 25 displaying a list of task indices representing an outline of ToDo tasks is displayed. The task index list display area 25 displays a plurality of unprocessed task indices 23*a*, 23*b*, 23*c*, and 23*d* of unprocessed ToDo tasks and processed task indices 23*e*, 23*f*, 23*g*, 23*h*, and 23*i* of processed ToDo tasks. Incidentally, in the descriptions below, the respective task indices are collectively referred to as task indices 23.

The task index list display area 25 displays, for example, a list of unprocessed task indices 23 in the order of deadline dates with earlier dates arranged earlier (ascending order). Subsequently, a list of processed task indices 23 is displayed in the order of processed dates with later dates arranged earlier (descending order).

Incidentally, when the number of task indices 23 to display in the list is larger than the number of task indices that can be displayed in the task index list display area 25, the list of task indices 23 is displayed in a scrollable manner.

Here, as illustrated in FIG. 2A, the number of displayed unprocessed task indices 23 is increased by not displaying the icons or deadline dates of the processed task indices 23 and thereby reducing the amount of displayed information.

The task indices 23 listed on the portal service screen include the contents of the task to be processed using the application, a first icon to transit to a head screen or initial screen of the application, and a second icon to transit to an operation screen, of the application, corresponding to the contents of the task to be processed. Details will be described later.

Moreover, depending to the contents of the task, the task index 23 may not display the second icon but display the contents of the task to be processed using the application and the first icon to transit to a head screen or initial screen of the application.

When the first icon displayed in the task index 23 is clicked or tapped on by the user, the portal service screen transits to a head screen or initial screen of the application for processing the ToDo task.

When the second icon displayed in the task index 23 is clicked or tapped on by the user, the portal service screen transits to an operation screen corresponding to the contents of the ToDo task of the application to process the ToDo task, thereby allowing for processing the ToDo task using the application.

Also, when a rectangular area of the unprocessed task index 23 displayed in the task index list display area 25 is clicked or tapped on by the user, the portal service screen may transit to a head screen or initial screen of the application for processing the ToDo task to allow activation of the application.

«Gadget Display Area»

In the left end part of the screen, a gadget display area 24 to display real-time sales information or the like is provided. This gadget display area 24 and the menu bar of applications are always displayed on a screen even after screen transition. Therefore, a processing screen of the application activated by clicking or tapping on the icon is displayed on a screen area excluding the gadget display area 24 and a display area of the application icons 20 in the upper part of the screen.

«Portal Service Screen on Portable Terminal»

Figure 2B:
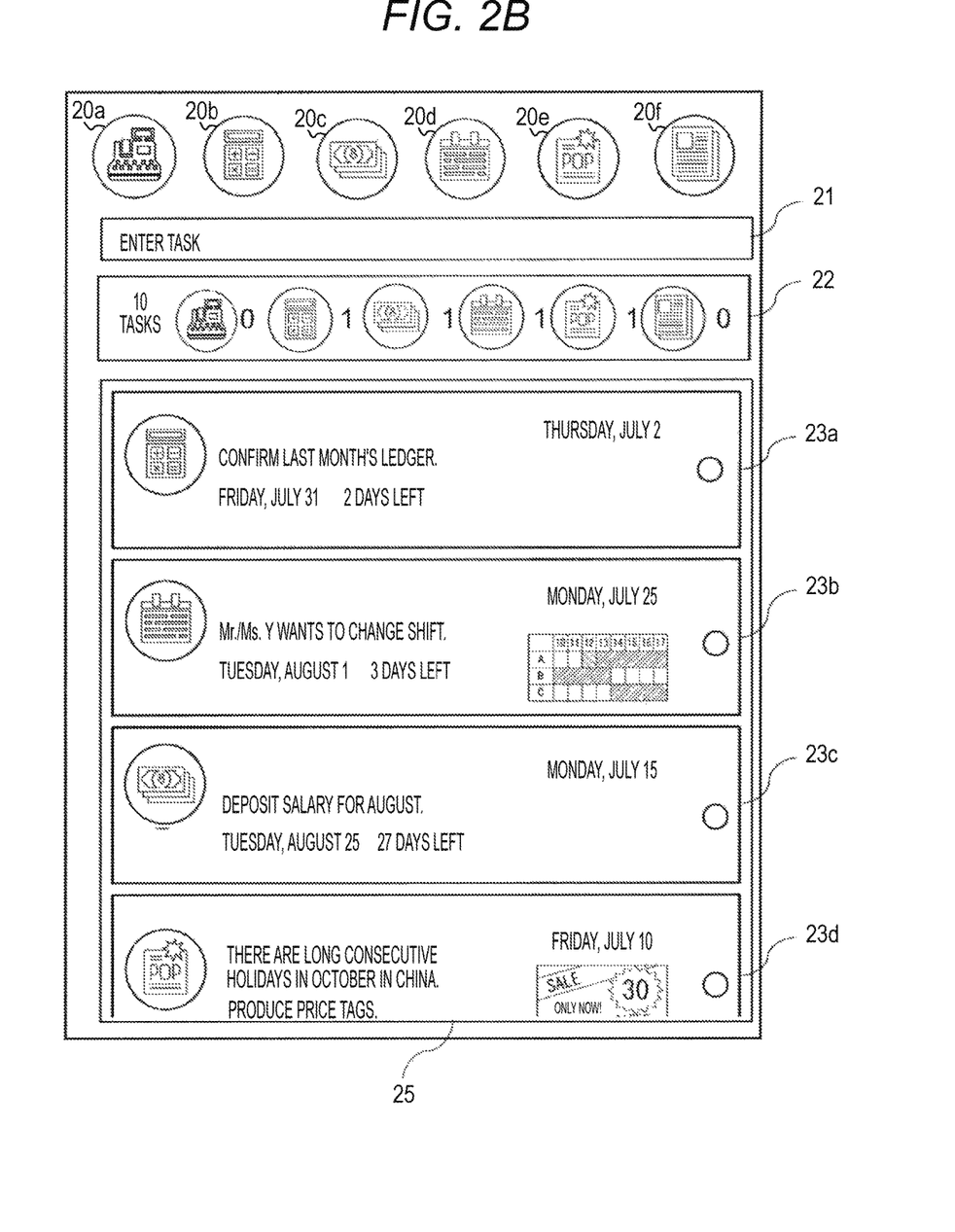
FIG. 2B is a diagram illustrating an exemplary portal service screen on a portable terminal.

FIG. 2B illustrates a portal service screen displayed on a screen by a web browser of the portable terminals 2*a* and 2*b*.

The portable terminals 2*a* and 2*b* often have a display screen longer in the vertical direction with shorter width as compared to those of the PCs 3*a* and 3*b*. In order to prevent deterioration of display quality due to reduction display, the portable terminals 2*a* and 2*b* have a display form to secure the task index list display area 25 without displaying the gadget display area 24.

Specifically, the menu bar of applications is arranged in the upper part of the screen, below which the task registration area 21, total task number display area 22, and task index list display area 25 of the ToDo tasks are arranged. The contents of each area are similar to those in FIG. 2A and thus descriptions thereon are omitted here.

Meanwhile, of the portable terminals 2*a* and 2*b*, some terminals have a function to change the direction of screen display according to the direction of the terminal. In such a terminal, the portal service screen including the gadget display area 24 illustrated in FIG. 2A may be displayed according to the direction of the terminal.

«Screen Transition»

Figure 3:
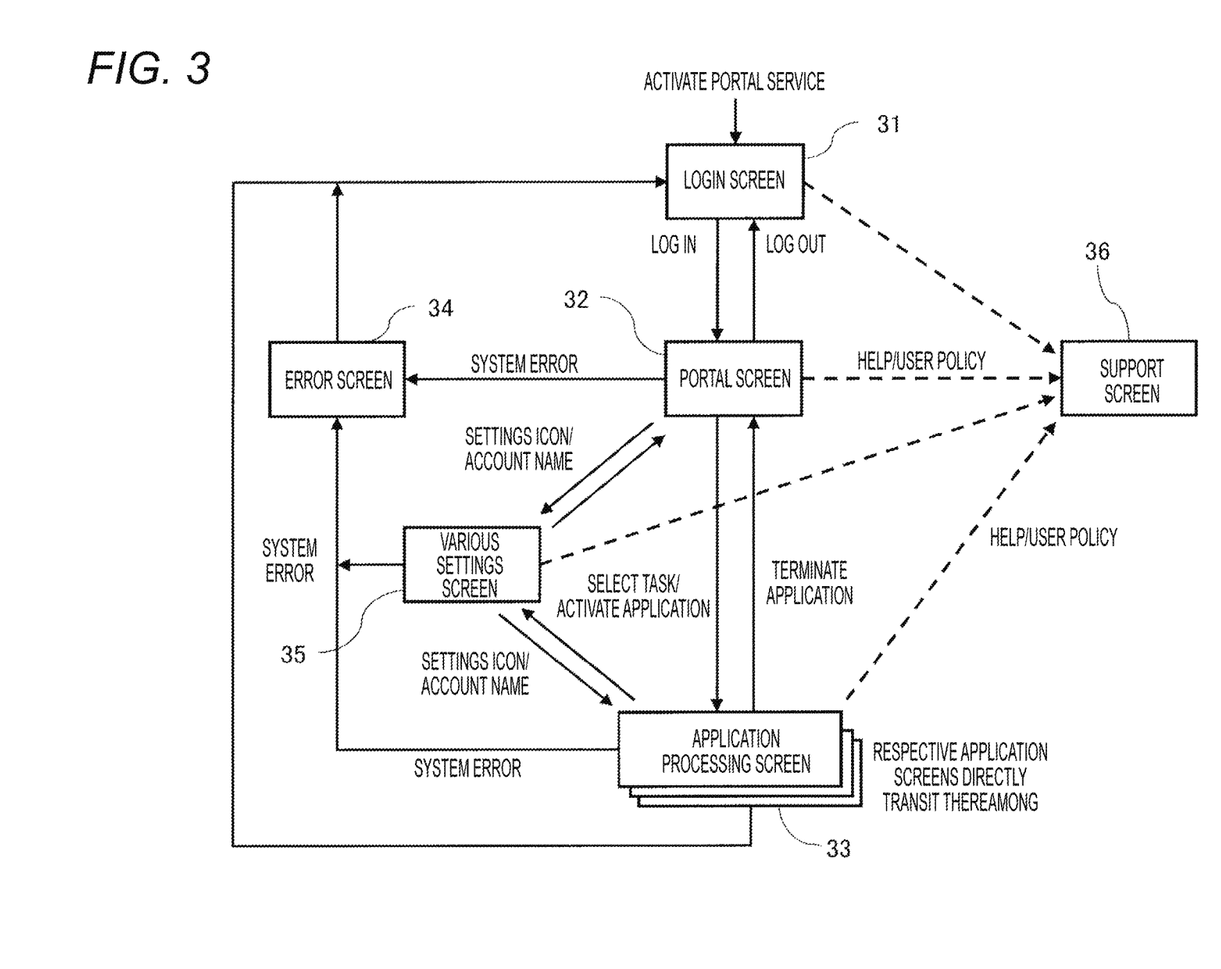
FIG. 3 is a diagram explaining screen transition of the work support system.

Here, an outline of screen transition in the user terminal controlled by the work support system 1 of the embodiment will be described with FIG. 3.

When the ToDo portal service 5 (see FIG. 1) is activated and accessed from the user terminal, the ToDo portal service 5 displays a login screen 31 on the user terminal in cooperation with the user authentication unit 4 (see FIG. 1).

When a login ID and password of the user is input on the login screen 31 and authentication by the user authentication unit 4 is performed, the ToDo portal service 5 displays a portal screen 32 (see FIGS. 2A and 2B) corresponding to the user based on the login ID.

Here, authentication processing of the operation application is also performed, thereby skipping authentication processing upon activating the operation application on the portal screen. The authentication processing of the operation application will be described later. Specifically, the user authentication unit 4 manages the login ID and password of the operation applications for each user terminal (user) and, after authentication on the login screen 31, a password of the operation application is notified to the ToDo portal service 5. The ToDo portal service 5 performs authentication processing of the operation application based on the notified password.

Although not illustrated in FIG. 2A or 2B, when a "Log out" button on the portal screen 32 is clicked or tapped on, the ToDo portal service 5 performs logout processing and transits to the login screen 31. Here, logout processing of the operation application is also performed.

Clicking or tapping on the icon described in FIGS. 2A and 2B causes the ToDo portal service 5 to display an application processing screen 33 of the application related to the icon. This allows for performing processing of the ToDo task.

When processing of service on the application processing screen 33 is finished, the ToDo portal service 5 returns to the portal screen 32 and displays a list of unprocessed task indices 23 and processed task indices 23. Here, the task index of the processed ToDo task moves from a group of unprocessed task indices 23 to a group of processed task indices 23 and thereby listed.

The application processing screen 33 may transit to the login screen 31.

Although not illustrated in FIG. 2A or 2B, the portal screen 32 or application processing screen 33 displays a settings icon or account name button. When one of the above is clicked or tapped on, the ToDo portal service 5 transits to a various settings screen 35, thereby allowing for displaying/changing account information or changing settings of a program of the ToDo portal service 5.

When a system error occurs on the login screen 31, portal screen 32, application processing screen 33, or various settings screen 35, transition to an error screen 34 occurs and the contents of the error are displayed. Logout processing is then performed and transition to the login screen 31 occurs.

On the login screen 31, portal screen 32, application processing screen 33, or various settings screen 35, a "Help" button or "User policy" display button is provided. When one of the buttons is clicked or tapped on, transition to a support screen 36 occurs and help information such as "How to use the application program" or a user policy is displayed.

Next, the application processing screen 33 will be described.

Figure 4:
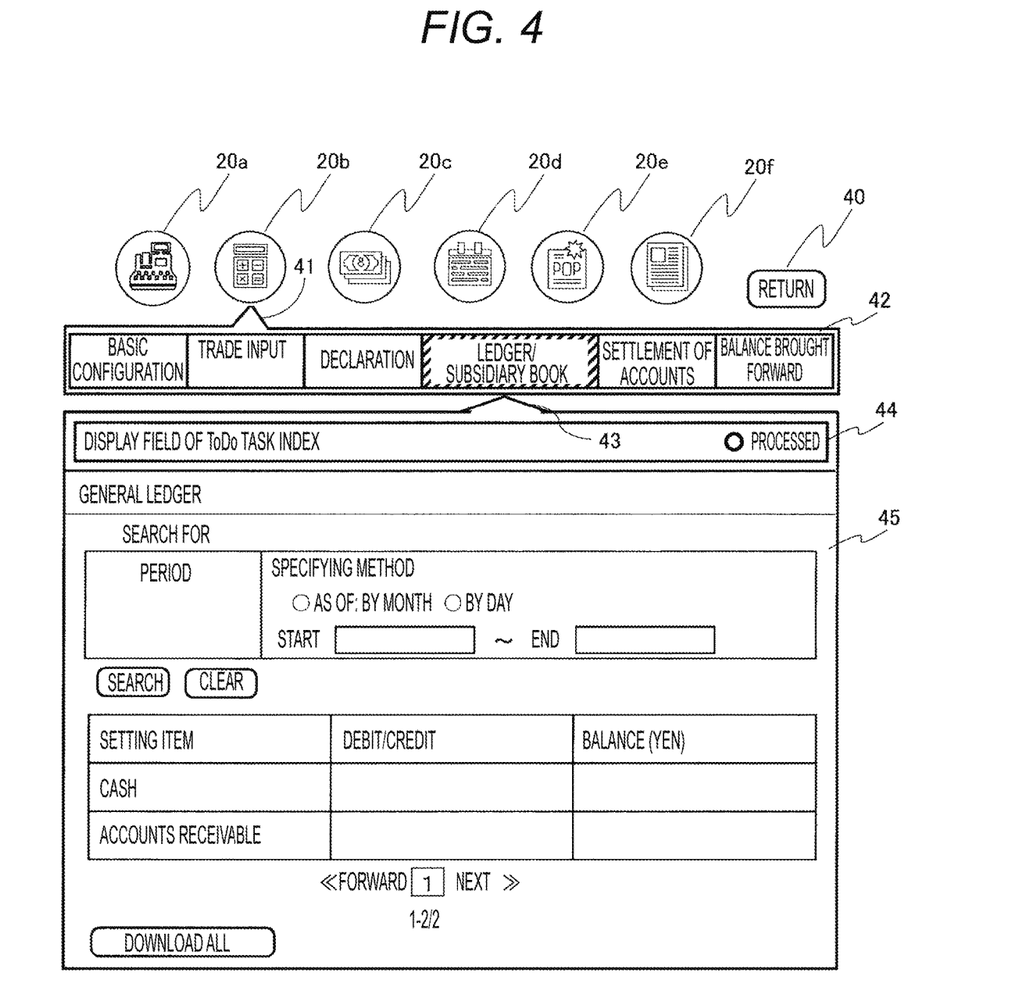
FIG. 4 is a diagram illustrating an exemplary processing screen of accounting management service.

FIG. 4 is a diagram illustrating an exemplary processing screen of the accounting management operation 8.

In the upper part of the screen, a menu bar of the applications is provided where the application icons 20 same as those on the portal screen in FIGS. 2A and 2B are displayed. Furthermore, the application icon 20b of the accounting management operation 8 and the processing screen of the accounting management operation 8 are associated by a triangular figure 41 representing relation therebetween. This allows the user to easily recognize that the processing screen is related to the accounting management operation 8.

The application icons 20 in the menu bar of the applications in the upper part of the screen are displayed on the application processing screen 33 (see FIG. 3) for each application in a fixed manner regardless of the contents of the application processing screen 33. Clicking or tapping on any of these application icons 20 results in screen transition to a predetermined processing screen of the application corresponding to the application icon 20, thereby allowing for activation of the application. This allows for activating another business oriented application program without returning to the portal screen.

A "Return" button 40 is displayed near the menu bar. Clicking or tapping on the "Return" button 40 results in returning to the portal screen 32 (see FIG. 3). Here, when processing of ToDo task is finished, the unprocessed task index 23 of the ToDo task is changed to the processed task index 23.

The application to process the accounting management operation 8 in FIG. 4 has a plurality of functions (programs) and displays each of the functions in a tab bar 42 as tabs of letters representing names of the functions. Specifically, processing of each of "Basic configuration", "Trade input", "Declaration", "Ledger/Subsidiary book", "Settlement of accounts", and "Balance brought forward" of the accounting management operation 8 is allocated to the tab in the tab bar 42. Clicking or tapping on one of the tabs in the tab bar 42 results in activation of the function (program) allocated to the tab.

A processing screen of the "Ledger/Subsidiary book" tab in the tab bar 42 is of display service of a general ledger. Moreover, the processing screen of this "Ledger/Subsidiary book" tab is a representative processing screen of the accounting management operation 8. Clicking or tapping on the application icon 20b on a processing screen of another application other than the accounting management operation 8 or the portal screen 32 results in transition to the processing screen of this "ledger/subsidiary book" tab.

There are also cases where the icon of the task index 23 or a rectangular area of the task index 23 and the processing screen of this "Ledger/Subsidiary book" tab are associated. Details will be described later.

A processing screen 45 is associated with the "Ledger/Subsidiary book" tab by a triangular figure 43 representing relation therebetween. This allows the user to easily recognize that the processing screen 45 is related to processing of "Ledger/Subsidiary book" of the accounting management operation 8.

The processing screen 45 displays the contents of the general ledger in accounting processing by setting search conditions. Detailed descriptions on a screen configuration thereof are omitted.

Furthermore, a task display field 44 to simply display the contents of the related task index 23 is provided on the processing screen 45. The task display field 44 displays, for example, a comment as of generation of the ToDo task, which is also displayed in the task index 23. This allows the user to easily grasp the sequence of work even when the user has left half way in the work and restarted the work after returning afterwards.

«Display Type of Task Index»

Next, exemplary display of the unprocessed task index 23 illustrated in FIGS. 2A and 2B will be described with FIGS. 5A, 5B, and 5C.

As for a display form of the task index 23, there are following three types with regard to handling association with applications for processing the ToDo tasks.

Figure 5A:
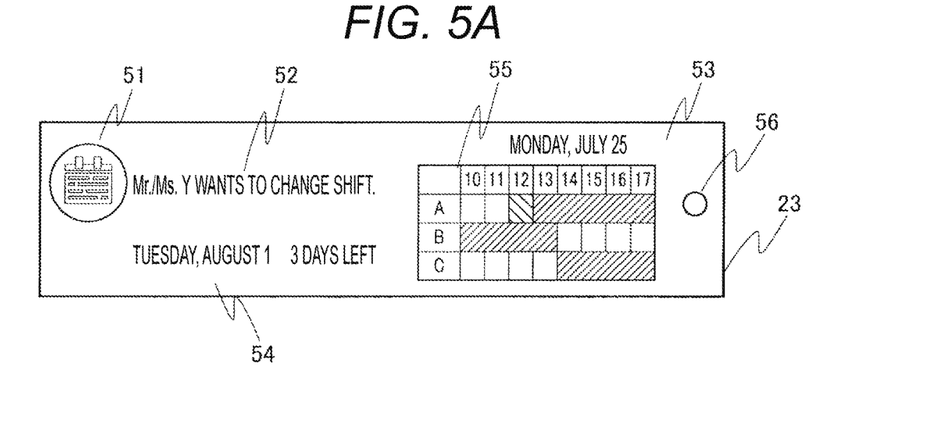
FIG. 5A is a diagram illustrating first exemplary display of a task index.

One type is for the case of a ToDo task requiring processing with the application as illustrated in FIG. 5A where the thumbnail display area 55 (second icon) to display a thumbnail image of a graph or table corresponding to an operation screen for transition to an operation screen of the application corresponding to the contents of the ToDo task to be processed is displayed.

As illustrated in FIG. 5A, the task index 23 displays a display area 51 of an application icon (first icon) for transition to a head screen or initial screen of the application, a comment display area 52 to display the contents of the task to be processed using the application, a display area 53 of registered date of the ToDo task, a display area 54 of a deadline of the ToDo task and the number of remaining days, a thumbnail display area 55 (second icon) to display a thumbnail image of a graph or table corresponding to an operation screen for transition to an operation screen of the application corresponding to the contents of the ToDo task to be processed, and a check box 56, for entering that processing of the ToDo task has been completed.

In this type, the thumbnail image is associated with a function of the application to process the ToDo task and thereby made as an icon. Clicking or tapping on this icon results in transition to a processing screen (operation screen) of the application corresponding to the contents of the ToDo task to be processed.

In exemplary display as illustrated in FIG. 5A, a thumbnail image of work shift table is displayed as a second icon. A function (application program) of shift management in an employment management operation application is associated therewith.

Figure 5B:
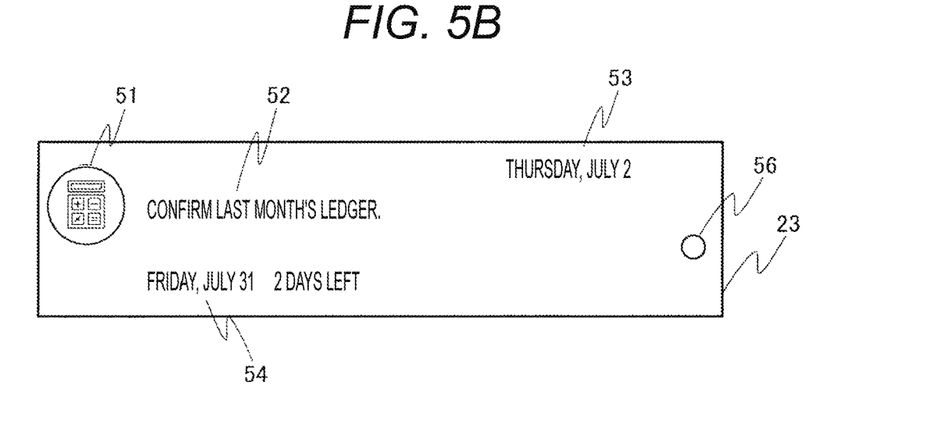
FIG. 5B is a diagram illustrating second exemplary display of a task index.

A second type is for the case of a ToDo task requiring processing with the application as illustrated in FIG. 5B. Unlike in FIG. 5A, the thumbnail display area 55 (second icon) to display a thumbnail image of a graph or table corresponding to an operation screen for transition to an operation screen of the application corresponding to the contents of the ToDo task to be processed is not displayed.

As illustrated in FIG. 5B, the task index 23 displays a display area 51 of an application icon (first icon) for transition to a head screen or initial screen of the application, a comment display area 52 to display the contents of the task to be processed using the application, a display area 53 of registered date of the ToDo task, a display area 54 of a deadline of the ToDo task and the number of remaining days, and a check box 56, for entering that processing of the ToDo task has been completed.

In this type, a display area 51 of the application icon (first icon) displayed in the task indices 23 and the rectangular area of the task index 23 are associated with a function of the application to process the ToDo task. Clicking or tapping on the rectangular area of the task index 23 results in screen transition from the portal screen 32 to an operation screen of the application to process the contents of the ToDo task.

Furthermore, when the display area 51 of the application icon is clicked or tapped on, the portal screen 32 transits to a head screen or initial screen of the application corresponding to the application icon.

Figure 5C:
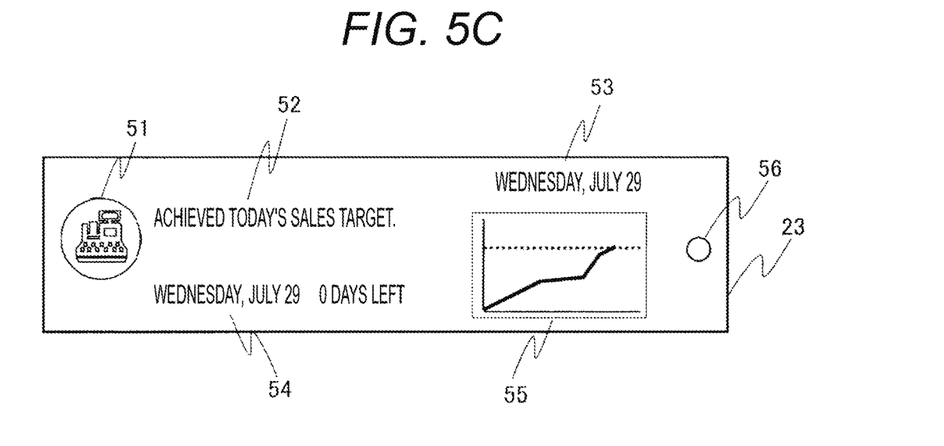
FIG. 5C is a diagram illustrating third exemplary display of a task index.

A third type is for the case of a ToDo task not requiring processing with the application as illustrated in FIG. 5C such as state notification from the application.

As illustrated in FIG. 5C, the task index 23 displays a display area 51 of an application icon (first icon) for transition to a head screen or initial screen of the application, a comment display area 52 to display the contents of the task to be processed using the application, a display area 53 of registered date of the ToDo task, a display area 54 of a deadline of the ToDo task and the number of remaining days, a thumbnail display area 55 (second icon) to display a thumbnail image of a graph or table showing a state of operation, and a check box 56, for entering that processing of the ToDo task has been completed.

In this type, it is not required to activate the application in order to process the ToDo task and thus no function of the application to process the ToDo task is not associated to the thumbnail.

«Configuration of Display Fields»

Next, display contents of the task index 23 will be described in detail with FIG. 5A. Incidentally, FIGS. 5B and 5C also have a similar display field configuration.

A display area of the task index 23 includes the display area 51 of the application icon (first icon) for transition to a head screen or initial screen of the application, comment display area 52 to display the contents of the generated ToDo task, display area 53 representing a registered date of the ToDo task, display area 54 representing a deadline of the ToDo task and the number of remaining days, thumbnail display area 55 (second icon) to display a thumbnail image of a graph or table corresponding to an operation screen for transition to an operation screen of the application corresponding to the contents of the ToDo task to be processed, and a check box 56 for entering that processing of the ToDo task has been completed.

Describing arrangement in the task index 23, the display area 51 of the application icon (first icon) is displayed in one side (left end side) of the display area of the task index 23, the comment display area 52 is displayed in the center of the display area of the task index 23, and the thumbnail display area 55 (second icon) is displayed in another side (right end side) of the display area of the task index 23.

Display contents of each of the display areas are stored in the task DB 6 (see FIG. 1) and is displayed in a list. The task DB 6 will be described later.

The aforementioned display configuration of the task index 23 allows for easily grasping the contents of the unprocessed ToDo task.

Moreover, each of an icon image in the display area 51 of the application icon and the thumbnail image displayed in the thumbnail display area 55 is associated with a different function (processing) and thereby iconized. Clicking or tapping on one of these icons allows for selecting and activating the application to process the ToDo task, thereby allowing processing of the ToDo task to be performed easily.

As illustrated in FIG. 5B, also in a case where a thumbnail is not displayed, associating a function of the application to process the ToDo task with the rectangular area of the task index 23 and thereby iconizing allow for easy activation of the application to process the ToDo task.

Specifically, when an area excluding the display area 51 of the application icon from the rectangular area of the task index 23 is clicked or tapped on, the portal screen 32 transits to an operation screen of the application for processing the contents of the ToDo task.

Furthermore, when the display area 51 of the application icon is clicked or tapped on, the portal screen 32 transits to a head screen or initial screen of the application corresponding to the application icon.

Figure 6:
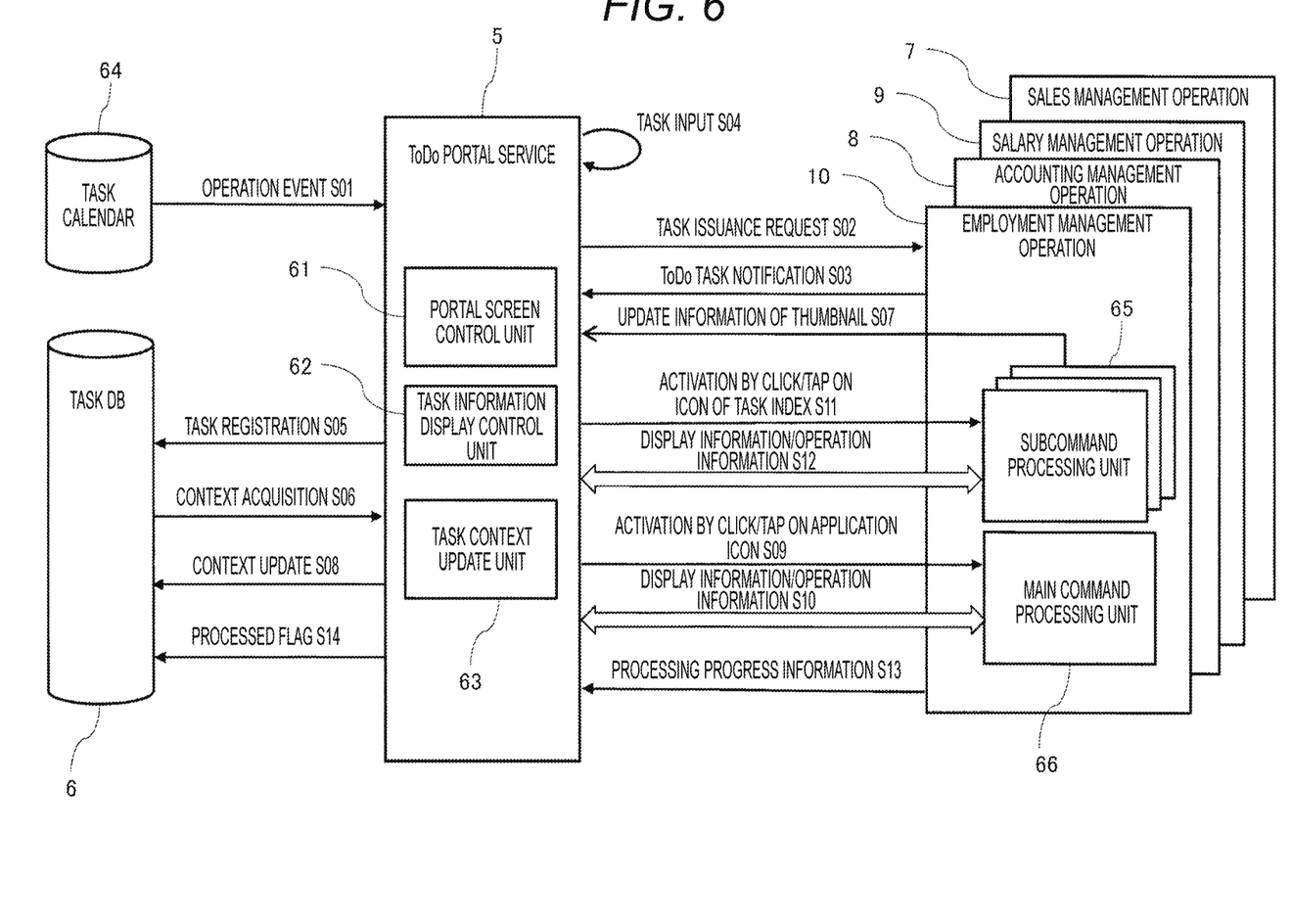
FIG. 6 is a diagram explaining a configuration to control portal screen transition.

A configuration to control screen transition between the aforementioned portal screen 32 (see FIG. 3) and the processing screen 33 of the application (see FIG. 3) will be described with FIG. 6.

The ToDo portal service 5 is implemented as a web application program in a server device and includes a portal screen control unit 61 to perform display control and transition control of the portal screen illustrated in FIGS. 2A and 2B and processing screen of the application, a task information display control unit 62 to control displaying a list of task indices 23, and a task context update unit 63 to control update of the contents of the task index 23.

Furthermore, the ToDo portal service 5 is connected with a task calendar 64 to store a calendar of processing of the respective operations. The ToDo portal service 5 refers to this task calendar 64 and generate a ToDo task.

The ToDo portal service 5 is further connected to the task DB 6, which stores display information of the task index 23 and updates the display contents of the task index 23 registered in the task DB 6 based on notification from the application of each of the operations.

The sales management operation 7, accounting management operation 8, salary management operation 9, and employment management operation 10 are implemented as application programs in a server device. The application program of each of the operations has a plurality of functions (programs) corresponding to the tabs in the tab bar 42 illustrated in FIG. 4.

Moreover, the application program of each of the operations includes a main command processing unit 66 to process a representative function and a plurality of subcommand processing units 65 to process other functions.

Next, processing procedure of the ToDo portal service 5 will be described.

The task calendar 64 stores operation events such as a processing date of year-end adjustment for each year or a salary deposit date of worker for each month. The ToDo portal service 5 refers to the task calendar 64 and acquires the operation events (S01).

The ToDo portal service 5 requests the application of the related operation to issue a task of the ToDo task to be processed based on the acquired operation events (S02).

The application of the employment management operation 10 or the like transmits, to the ToDo portal service 5, a program ID that is identification information of the application program to process the ToDo task and ToDo task notification including service information showing processing state of the operation such as a sales graph or work shift table, thereby responding to the request to issue a task (S03).

Also, when the employment management operation 10 directly receives a request such a change of shift from a worker, ToDo task notification is transmitted to the ToDo portal service 5. In this case, it is preferable that service information includes a work shift table as of a requesting date for the change of shift.

Furthermore, when confirmative notification such as notification of achieved target sales as illustrated in FIG. 5C is the ToDo task, a ToDo task notification (S03) including a program ID of a function (program) of sales totaling processing, service information showing a sales graph, and comment information to be displayed in the comment display area 52 in the task index 23 (FIG. 5A) is transmitted from the application of the sales management operation 7 to the ToDo portal service 5.

The ToDo portal service 5, having received the aforementioned ToDo task notification (S03), registers the ToDo task notification in the task DB 6 as a task (S05).

Incidentally, the ToDo task input in the task registration area (text box) 21 in FIG. 2A or FIG. 2B is also registered in the task DB 6 as a task (S04).

Here, a configuration of the task DB 6 will be described with FIG. 7.

Figure 7:
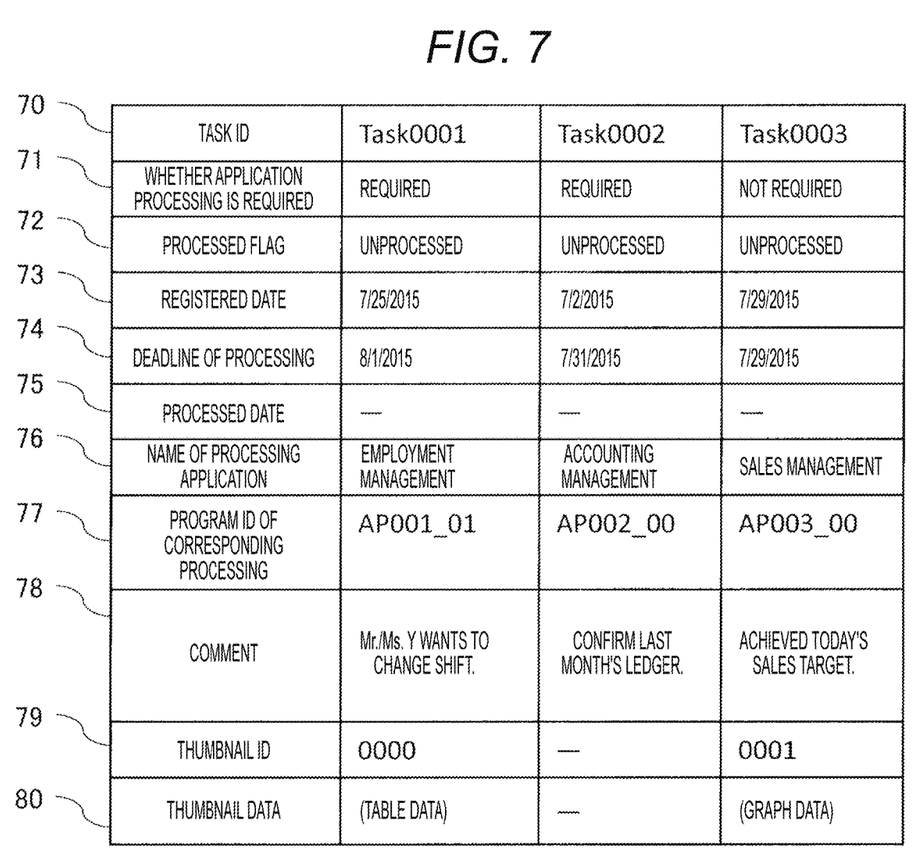
FIG. 7 is a diagram illustrating an exemplary configuration of a task DB.

The task DB 6 is registered with a plurality of items with symbols of 71 to 80 as illustrated in FIG. 7 for each task ID 70 allocated to the ToDo task to be registered.

The task DB 6 is referred to for each ToDo task by the task information display control unit 62 and the registered contents in the task DB 6 are displayed in the task index list display area 25 (see FIGS. 2A and 2B) as task indices 23a to 23i. The task information display control unit 62 will be described later.

The task DB 6 is referred to also by the portal screen control unit 61 and the number of ToDo tasks is totaled up for a processing application name 76. The total number is displayed on the total task number display area 22 (see FIGS. 2A and 2B). The portal screen control unit 61 will be described later.

Next, registering items of the task DB 6 illustrated in FIG. 7 will be described in detail.

The contents of the task DB 6 in FIG. 7 correspond to FIG. 5A (Task 0001), FIG. 5B (Task 0002), and FIG. 5C (Task 0003).

Whether application processing is required 71 illustrates whether the ToDo task requires processing with the application.

Since FIG. 5C (Task 0003) is a state notification task from the application as described earlier, "not required" is set.

The processed flag 72 illustrates whether processing with the application corresponding to the ToDo task has been completed. Since FIGS. 5A, 5B, and 5C are unprocessed task indices 23 as described earlier, "unprocessed" is set for all. Processing with the application corresponding to the ToDo task results in setting of "processed".

The processed flag 72 is referred to by the task information display control unit 62 for selection of the unprocessed task indices 23a, 23b, 23c, and 23d and processed task indices 23e, 23f, 23g, 23h, and 23i (see FIG. 2A).

A registered date 73 is information of a date when the ToDo task is registered. The registered date 73 is referred to by the task information display control unit 62 and displayed in the display area 53 of registered date of the ToDo task of the task index 23 (FIG. 5A).

A deadline of processing 74 is information of a date of deadline for processing the ToDo task. The deadline of processing 74 is referred to by the task information display control unit 62 and displayed in the display area 54 of deadline of processing of the ToDo task and the number of remaining days (FIG. 5A) where the unprocessed task indices 23 are listed in an ascending order.

The processed date 75 is information of a date when the application corresponding to the ToDo task is executed and processing of the ToDo task is completed. The processed date 75 is referred to by the task information display control unit 62. The task indices 23 are displayed as a list of processed task indices 23 arranged in the order of processed dates with later dates arranged earlier (descending order).

The processing application name 76 shows a name of the application corresponding to the ToDo task.

A program ID 77 of the corresponding processing is of the application or program corresponding to the ToDo task. When the icon in the thumbnail display area 55 in the task index 23 or the rectangular area of the task index 23 is clicked or tapped on, the program ID 77 is referred to by the portal screen control unit 61 and the application specified by the program ID is activated.

A comment 78 represents an outline of processing contents of the ToDo task and stores letters to be displayed in the comment display area 52 (see FIG. 5A) in the task index 23. The comment 78 is referred to by the task information display control unit 62 and displayed.

A thumbnail ID 79 shows an identification ID of a thumbnail image displayed in the thumbnail display area 55 (see FIG. 5A) in the task index 23.

Thumbnail data 80 is thumbnail image information of table data or graph data displayed in the thumbnail display area 55.

This thumbnail ID 79 and thumbnail data 80 are referred to by the task information display control unit 62, displayed in the thumbnail display area 55 in the task index 23, and updated by the task context update unit 63 based on update information of a thumbnail image from the application.

Referring back to FIG. 6, subsequent processing of the ToDo portal service 5 will be described.

The portal screen control unit 61 of the ToDo portal service 5 controls the task information display control unit 62, displays the portal screen illustrated in FIG. 2A or 2B and controls screen transition corresponding to screen operation information such as clicking, tapping, or the like.

The task information display control unit 62 refers to the task DB 6, acquires context of the ToDo task (S06), generates the task index 23, and displays a list based on predetermined priorities.

Furthermore, the task information display control unit 62 changes the unprocessed task index 23 of the ToDo task having been processed to the processed task index 23 when the portal screen control unit 61 causes transition from a processing screen of the application to the portal screen due to completion of processing with the application corresponding to the ToDo task and updates display of the list of the task indices 23.

Meanwhile, sales of a store or shift schedule of workers vary at any time and thus service information notified by the ToDo task notification (S03) needs to be updated. Therefore, the task context update unit 63 acquires update information of a thumbnail such as a sales table or work shift table generated based on the sales information DB of the sales management operation 7 or the employment information DB of the employment management operation 10 (S07) and stores the update information in the thumbnail data 80 in the task DB 6, thereby updates the context of the ToDo task (S08). Thereafter, the thumbnail in the task index 23 is updated by the task information display control unit 62.

When detecting that an icon in the display area 51 of application icon in the task index 23 is clicked or tapped on, the portal screen control unit 61 activates the main command processing unit 66 to process a representative function of the application related to the icon (S09).

The portal screen control unit 61 further performs screen control such that a head screen or initial screen of the application related to the icon by the display information from the main command processing unit 66 is displayed instead of display of the list of task indices 23 (S10).

When detecting that the icon in the thumbnail display area 55 in the task index 23 or the rectangular area of the task index 23 is clicked or tapped on, the portal screen control unit 61 activates the subcommand processing unit 65 to process a function of the application related to the icon or the area (S11). The portal screen control unit 61 further performs screen control such that an operation screen of the application corresponding to the contents of the ToDo task displayed in the task index 23 by the display information from the subcommand processing unit 65 is displayed instead of display of the list of task indices 23 (S12).

The task context update unit 63 acquires information of processing progress with the application (S13) and updates the processed flag 72 (see FIG. 7) of the corresponding ToDo task in the task DB 6 to "processed" (S14).

The task information display control unit 62 refers to the task DB 6 and changes the task index 23 corresponding to the ToDo task where the processed flag 72 is updated to "processed" from a group of unprocessed task indices 23 to a group of processed task indices 23, and thereby displays the list thereof.

The work support system of the aforementioned embodiment allows for easy activation of operation applications related to the plurality of ToDo tasks, thereby enhancing efficiency of work.

The invention claimed is:

1. A work support system, comprising:
   a work support server comprising a processor and a memory, wherein the work support server communicates with a plurality of applications and maintains a to-do calendar of tasks to be performed by a user of the plurality of applications, and wherein the processor of the work support server is configured to execute a program to perform operations comprising:
   referring to the to-do calendar and generating a task list user interface display screen for display on a user display screen, the task list user interface display screen including a list of a plurality of task indices, each of the task indices including (i) content of a task to be processed using one of the plurality of applications, and (ii) a first icon for causing transition to a head screen or initial screen of the application, and at least one of the task indices further including (iii) a second icon for causing transition directly to an operation screen of the application corresponding to the content of the task to be processed; and
   in response to a user input with respect to the first icon or the second icon of said at least one of the task indices, transitioning the user display screen from the task list user interface display screen to the head screen or initial screen of the application in response to the user input with respect to the first icon, and transitioning the user display interface from the task list user interface display screen directly to the operation screen of the application corresponding to the content of the task to be processed in response to the user input with respect to the second icon.

2. The work support system according to claim 1, wherein the second icon is a thumbnail image of a graph or table corresponding to the operation screen of the application.

3. The work support system according to claim 1, wherein the processor generates the task list user interface display screen such that, in said at least one of the task indices including the second icon, the first icon is displayed on one side of a display area of the task index and the second icon is displayed on another side of the display area of the task index.

4. The work support system according to claim 1, wherein the processor generates the task list user interface display screen such that one of the task indices includes the first icon and does not include the second icon, according to the content of the task.

5. The work support system according to claim 1, wherein the processor generates the task list user interface display screen such that, in said at least one of the task indices including the second icon, the first icon, the content of the task, and the second icon are displayed in this order in a display area of the task index.

6. The work support system according to claim 1, wherein the processor generates the task list user interface display screen such that at least one of the task indices further includes a check box for setting whether the content of the task has been completed is displayed in a display area of the task index.

7. A work support method, comprising:
   referring to schedule data stored in a memory and, based on the schedule data, causing a display to display a task list user interface display screen in which a plurality of tasks to be processed using an application are arranged as a plurality of task indices, each of the task indices including (i) content of the task to be processed, and (ii) a first icon for causing transition to a head screen or initial screen of the application, and at least one of the task indices further including (iii) a second icon for causing transition directly to an operation screen of the application corresponding to the content of the task to be processed; and
   in response to a user input with respect to the first icon or the second icon of said at least one of the task indices, causing the display to switch from displaying the task list user interface display screen to displaying the head screen or initial screen of the application in response to the user input with respect to the first icon, and causing the display to switch from displaying the task list user interface display screen directly to the operation screen of the application corresponding to the content of the task to be processed in response to the user input with respect to the second icon.

8. The work support method according to claim 7, wherein the task list user interface display screen is displayed such that one of the task indices includes the first icon and does not include the second icon, according to the content of the task.

9. The work support method according to claim 7, wherein the task list user interface display screen is displayed such that, in said at least one of the task indices including the second icon, the first icon, the content of the task, and the second icon are displayed in this order in a display area of the task index.

10. The work support method according to claim 7, wherein the task list user interface display screen is displayed such that one of the task indices further includes a check box for setting whether the content of the task has been completed is displayed in a display area of the task index.

11. A non-transitory computer-readable recording medium storing a program for causing a computer to execute operations comprising:
  referring to schedule data stored in a memory and, based on the schedule data, causing a display to display a task list user interface display screen in which a plurality of tasks to be processed using an application are arranged as a plurality of task indices, each of the task indices including (i) content of the task to be processed, and (ii) a first icon for causing transition to a head screen or initial screen of the application, and at least one of the task indices further including (iii) a second icon for causing transition directly to an operation screen of the application corresponding to the content of the task to be processed; and
  in response to a user input with respect to the first icon or the second icon of said at least one of the task indices, causing the display to switch from displaying the task list user interface display screen to displaying the head screen or initial screen of the application in response to the user input with respect to the first icon, and causing the display to switch from displaying the task list user interface display screen directly to the operation screen of the application corresponding to the content of the task to be processed in response to the user input with respect to the second icon.

12. The non-transitory computer-readable recording medium according to claim 11, wherein the second icon is a thumbnail image of a graph or table corresponding to the operation screen of the application.

13. The non-transitory computer-readable recording medium according to claim 11, wherein the task list user interface display screen is displayed such that, in said at least one of the task indices including the second icon, the first icon s displayed on one side of a display area of the task index and the second icon is displayed on another side of the display area of the task index.

14. The non-transitory computer-readable recording medium according to claim 11, wherein the task list user interface display screen is displayed such that one of the task indices includes the first icon and does not include the second icon, according to the content of the task.

15. The non-transitory computer-readable recording medium according to claim 11, wherein the task list user interface display screen is displayed such that, in said at least one of the task indices including the second icon, the first icon, the content of the task, and the second icon are displayed in this order in a display area of the task index.

16. The non-transitory computer-readable recording medium according to claim 11, wherein the task list user interface display screen is displayed such that one of the task indices further includes a check box for setting whether the content of the task has been completed is displayed in a display area of the task index.

17. The work system according to claim 1, wherein the processor generates the task list user interface display screen such that one of the task indices includes a notification from the application relating to the content of the task and the first icon for causing transition to a head screen or initial screen of the application, and does not include an icon for causing transition directly to the operation screen of the application corresponding to the content of the task.

18. The work support system according to claim 17, wherein the one of the task indices, which does not does not include an icon for causing transition directly to the operation screen of the application corresponding to the content of the task, includes a thumbnail image of a graph or table corresponding to the operation screen of the application.

19. The work support method according to claim 7, wherein the task list user interface display screen is displayed such that, in said at least one of the task indices including the second icon, the first icon is displayed on one side of a display area of the task index and the second icon is displayed on another side of the display area of the task index.

20. The work support method according to claim 7, wherein the second icon is a thumbnail image of a graph or table corresponding to the operation screen of the application.

* * * * *

UNITED STATES PATENT AND TRADEMARK OFFICE
CERTIFICATE OF CORRECTION

PATENT NO. : 10,268,972 B2
APPLICATION NO. : 15/176031
DATED : April 23, 2019
INVENTOR(S) : Tsuyoshi Ohsumi It is certified that error appears in the above-identified patent and that said Letters Patent is hereby corrected as shown below:

Column 15, Line 43, Claim 13, Line 5, delete "s" and insert --is--.

Column 16, Line 28, Claim 18, Line 2, delete "does not does not" and insert --does not--.

Signed and Sealed this
Twenty-ninth Day of October, 2019

Andrei Iancu
*Director of the United States Patent and Trademark Office*